United States Patent [19]

Ardis et al.

[11] 4,021,261

[45] May 3, 1977

[54] METHOD FOR DRYING COATINGS

[75] Inventors: Alan E. Ardis, North Haven; Lawrence E. Katz, Woodbridge, both of Conn.

[73] Assignee: Olin Corporation, New Haven, Conn.

[22] Filed: Jan. 13, 1976

[21] Appl. No.: 648,798

[52] U.S. Cl. .................................. 106/264; 106/310
[51] Int. Cl.$^2$ ...................... C09D 3/26; C09F 9/00
[58] Field of Search ........................... 106/264, 310

[56] References Cited

UNITED STATES PATENTS

| 2,526,718 | 10/1950 | Wheeler | 106/241 |
|---|---|---|---|
| 2,565,897 | 8/1951 | Wheeler | 106/264 |

OTHER PUBLICATIONS

Chem Abst.: 56: 14,423e, 1962.

*Primary Examiner*—Theodore Morris
*Attorney, Agent, or Firm*—William A. Simons; F. A. Iskander; Thomas P. O'Day

[57] ABSTRACT

Superior drying is obtained for coating compositions containing drying or semi-drying oils by incorporating therein an effective amount of 5-methyl-1,10-phenanthroline.

6 Claims, No Drawings

METHOD FOR DRYING COATINGS

BACKGROUND OF THE INVENTION

1. Field of the Invention

The present invention relates to a method for promoting the drying of coatings which cure by oxidative polymerization and which contain drying or semi-drying oils. More particularly, the invention relates to a method for promoting drying of paints by incorporating therein 5-methyl-1,10-phenanthroline and to paint formulations containing 5-methyl-1,10-phenanthroline as a drier catalyst.

2. Prior Art

It is well-known to those skilled in the paint art that unsubstituted o-phenanthroline, also known as 1,10-phenanthroline, is useful for promoting the drying of paints. Such a product is marketed under the trademark "ACTIV-8" by the R. T. Vanderbilt Company and is the subject of U.S. Pat. No. 2,565,897. Unfortunately, 1,10-phenanthroline has numerous disadvantages, one of which is that it is extremely costly to produce, making it undesirable for use in paints. More cost-effective alternatives which are better than unsubstituted 1,10-phenanthroline are required.

It was heretofore thought by those skilled in the coating art that 1,10-phenanthroline was unique in its action. The literature reports that of 400 compounds which are constitutionally related to it only one other compound[1] was found to act similarly. Payne, H. F., *Coating Technology*, Vol. I, page 237 (1954). For a similar statement involving some 500 compounds see Stearns, M.E., 1,10-*Phenanthroline Promotes the Drying of Paints*, Official Digest, Chicago Paint and Varnish Production Club, September, 1954.

[1]. See U.S. Patent 2,526,718 describing the use of $\alpha,\alpha,$-dipyridyl.

A number of substituted 1,10-phenanthrolines have been shown to be substantially less effective as paint drier catalysts than 1,10-phenanthroline itself. For example, both 2,5,9-trimethyl-1,10-phenanthroline and 2,9-dimethyl-1,10-phenanthroline are both quite inferior to the unsubstituted counterpart. We have now found, however, that 5-methyl-1,10-phenanthroline, is a highly effective drier catalyst for coatings containing drying and semi-drying oils and particularly for those containing manganese or cobalt paint driers. It is less costly to produce than 1,10-phenanthroline, is superior at comparable use levels in improving Surface and Hard Dry Times, is more effective in promoting low temperature drying of paints, and is superior to 1,10-phenanthroline in its ability to promote drying after prolonged storage of the formulated paint.

SUMMARY OF THE INVENTION

In accordance with the present invention there is provided a method for promoting drying of coatings which contain drying or semi-drying oils, and particularly for those which contain a manganese or cobalt drier, by incorporating therein 5-methyl-1,10-phenanthroline. In a second aspect the invention also comprises novel paint formulations containing 5-methyl-1,10-phenanthroline as a drier catalyst.

DETAILED DESCRIPTION OF THE INVENTION

Suitable substrates for use in accordance with the present invention are oleoresinous coatings, principally paints, printing inks and plastics in which the film-forming component is a drying or semi-drying oil which cures by oxidative polymerization and which generally contain driers based on manganese or cobalt. This includes coatings containing drying oils or a drying oil modified alkyd, urethane, polyester or vinyl polymer.

The metallic driers which may be employed in these formulations include the salts of manganese and/or cobalt which are commonly utilized as paint driers, for example, the naphthenates, octoates, oleates, linoleates, and resinates of manganese and/or cobalt. All are well known to those skilled in this art. These driers are conventionally used in coatings which are to be air dried in an amount such that the amount of metallic manganese or cobalt is present at a concentration of at least 0.003% by weight, advantageously at a concentration in the range of 0.003% by weight up to 0.3%, preferably 0.006% up to about 0.02% by weight of the formulation.

In addition, the coating formulation may suitably contain the usual pigments, fillers, extenders, solvents, thinners, plasticizers and the like, other drier catalysts and also auxiliary driers such as salts of calcium, zinc, lead, iron, cerium, zirconium or a combination of these.

In accordance with the present invention, it has been found that drying of such formulations is effectively and economically promoted by incorporating therein an effective amount of 5-methyl-1,10-phenanthroline, which as used herein includes suitable solvates, hydrates or salts thereof including but not limited to the monohydrate and borate salts thereof. Very small quantities of 5-methyl-1,10-phenanthroline are required to produce superior drying. Suitably, a concentration of at least 0.003% by weight based on the weight of total formulation is sufficient but any amount in excess of this may be employed if desired, advantageously from about 0.005% up to about 1%, preferably 0.006% to about 0.05%. A suitable ratio of 5-methyl-1,10-phenanthroline to metallic drier is in the range of 0.2:1 to 10:1 and preferably in the range of 0.3 to 5:1.

The following examples further demonstrate the practice of the present invention. Unless expressly stated to the contrary, all quantitative measurements are expressed by weight or weight percent.

EXAMPLE 1

Linseed Oil

A solution of 6% manganese naphthenate was added to linseed oil to produce a 0.059% manganese solution (based on metallic manganese present) in linseed oil.

Separate catalyst solutions, one containing 0.77% o-phenanthroline (Solution 1), the other containing 0.83% 5-methyl-1,10-phenanthroline (Solution 2) in linseed oil, were prepared. (The molar equivalents are both 0.04).

Two parts by volume of the manganese solution and 1 part by volume of linseed oil were mixed with 2 parts by volume of Solutions 1 and 2, respectively to produce Samples A and B, respectively.

A control sample, C, was prepared by mixing equal parts by volume of the manganese solution and linseed oil.

Each sample was spread on a 6 × 6 inch glass plate with a BOSTON-BRADLEY applicator set to deliver a 1 mil wet film. A GARDNER circular drying time recorder was placed on each of the plates and surface dry time recorded in an environment controlled at 75° F. and 10% relative humidity.

Results are reported in Table I as Surface Dry Time in Hours.

TABLE I

| SAMPLE | CATALYST | SURFACE DRY TIME (HRS.) | |
|---|---|---|---|
| | | Average | Runs |
| A | 1,10-Phenanthroline | 10.6 | 6 |
| B | 5-Methyl-1,10-Phenanthroline | 7.3 | 6 |
| C | Control | 21.3 | 6 |

EXAMPLE 2

Long Soya Alkyd Formulations

A paint base, having a typical formula as follows:
| | |
|---|---|
| Manganese Drier (6%) | 0.30g |
| Long Oil Alkyd (70% Solids) | 51g |
| Titanium Dioxide | 30g |
| Mineral Clay | 2g |
| Antiskinning Agent | 0.1–0.2g |
| Mineral Spirits | 15.6–16.1g | was prepared. To separate 100g portions of this base was added about 0.2g lead naphthenate (24% lead) to prepare Sample A, 1.14g "ZIRCO" (6% zirconium) to produce Sample B, 0.12g "ACTIV-8" (38% 1,10-phenanthroline) to prepare Sample C, 0.12-0.13g 5-methyl-1,10-phenanthroline (38% active ingredient) to produce Sample D, 0.12-0.13g crude 5-methyl-1,10-phenanthroline, (38% active ingredient of ~90% purity) to prepare Sample E and 0.22g 2,5,9-trimethyl-1,10-phenanthroline (38% active ingredient) to prepare Sample F. Wet film thickness was 2 mils. Surface Dry Time was measured as in Example 1 and is reported in Table II.

TABLE II

| SAMPLE | CATALYST | SURFACE DRY TIME (HRS.) | |
|---|---|---|---|
| | | Average | Runs |
| A | Lead | 7.2 | 3 |
| B | Zirconium | 9.7 | 6 |
| C | 1,10-Phenanthroline | 2.8 | 5 |
| D | 5-Methyl-1,10-Phenanthroline | 2.6 | 3 |
| E | Crude 5-Methyl-1,10-Phenanthroline | 2.6 | 4 |
| F | 2,5,9-Trimethyl-1,10-Phenanthroline | 6.3 | 3 |

EXAMPLE 3

Example 2 was repeated for comparative purposes with 1,10-phenanthroline and 5-methyl-1,10-phenanthroline using 0.006% manganese or 0.018% cobalt and the reported levels of drier catalyst. Both Surface Dry Time and Hard Dry Time at 75° F. were measured and are reported in Table III.

TABLE III

| CATALYST | CATALYST CONC. | DRIER | DRY TIMES (Average) | | |
|---|---|---|---|---|---|
| | | | Surface | Hard | Runs |
| 1,10-Phenanthroline | 0.012% | Mn | 3.7 | 4.4 | 4 |
| 5-Me-1,10-Phenanthroline | 0.010% | Mn | 3.1 | 3.3 | 2 |
| 5-Me-1,10-Phenanthroline | 0.012% | Mn | 3.1 | 3.9 | 3 |
| 1,10-Phenanthroline | 0.006% | Mn | 4.2 | 5.4 | 4 |
| 5-Me-1,10-Phenanthroline | 0.006% | Mn | 3.3 | 4.1 | 4 |
| 1,10-Phenanthroline | 0.006% | Co | 4.6 | 5.4 | 3 |
| 5-Me-1,10-Phenanthroline | 0.006% | Co | 3.1 | 3.4 | 4 |

EXAMPLE 4

Example 3 was repeated except that the resulting formulation was dried in a controlled environment at 50° F. –55° F. The formulation contained 0.006% manganese and 0.006% drier catalyst. Results are reported in Table IV in hours.

TABLE IV

| CATALYST | DRY TIME (Average) | | |
|---|---|---|---|
| | Surface | Hard | Runs |
| 1,10-Phenanthroline | 10.9 | 12.2 | 8 |
| 5-Me-1,10-Phenanthroline | 8.1 | 9.5 | 5 |

EXAMPLE 5

The formulation of Example 2, utilizing the designated percentages of metal drier and drier catalyst was stored for one month at 120° F. and then tested to determine Surface and Hard Dry Time at 75° F. The results are reported in Table V.

TABLE V

| CATALYST | CATALYST CONC. | DRIER | DRIER CONC. | DRY TIMES (Average) | | |
|---|---|---|---|---|---|---|
| | | | | Surface | Hard | Runs |
| 5-Me-1,10-Phenanthroline | 0.045% | Co | 0.018% | 5.1 | 6.4 | 4 |
| 1,10-Phenanthroline | 0.045% | Co | 0.018% | 7.7 | 9.8 | 4 |
| 5-Me-1,10-Phenanthroline | 0.006% | Mn | 0.006% | 15.4 | 16.7 | 3 |
| 1,10-Phenanthroline | 0.006% | Mn | 0.006% | 18.8 | 21.1 | 5 |

EXAMPLE 6

Example 2 was repeated except that both Surface and Hard Dry Time were recorded and are reported in Table V.

TABLE VI

| CATALYST | DRY TIMES (Average) | | |
|---|---|---|---|
| | Surface | Hard | Runs |
| 1,10-Phenanthroline | 3.4 | 6.6 | 5 |
| 5-Me-1,10-Phenanthroline | 3.0 | 4.8 | 6 |

What is claimed is:
1. A method for promoting drying of coatings containing drying or semi-drying oils which cure by oxida- tive polymerization comprising incorporating therein at least 0.003% 5-methyl-1,10-phenanthroline.

2. The method of claim 1 wherein said coating contains a metallic drier.

3. The method of claim 2 wherein said 5-methyl-1,10-phenanthroline is present at a concentration of from 0.006% to about 0.05%.

4. The method of claim 3 wherein said metallic drier is a manganese or cobalt drier which is present at a concentration of from 0.003% up to 0.3% based on the metallic component thereof.

5. The method of claim 4 wherein the weight ratio of said 5-methyl-1,10-phenanthroline to the metallic component of said drier is in the range of 0.2:1 to 10:1.

6. A paint formulation having incorporated therein a metallic drier based on manganese or cobalt, a drying or semi-drying oil which cures by oxidative polymerization, said formulation having incorporated therein at least 0.003% of 5-methyl-1,10-phenanthroline.

* * * * *